(12) United States Patent
Murr

(10) Patent No.: US 11,889,156 B2
(45) Date of Patent: Jan. 30, 2024

(54) COMPUTER-IMPLEMENTED METHOD FOR PRESENTING MULTIMEDIA INFORMATION

(71) Applicant: Jyad Murr, Geneva (CH)

(72) Inventor: Jyad Murr, Geneva (CH)

( * ) Notice: Subject to any disclaimer, the term of this patent is extended or adjusted under 35 U.S.C. 154(b) by 0 days.

(21) Appl. No.: 17/442,421

(22) PCT Filed: Mar. 20, 2020

(86) PCT No.: PCT/IB2020/052593
§ 371 (c)(1),
(2) Date: Sep. 23, 2021

(87) PCT Pub. No.: WO2019/194151
PCT Pub. Date: Oct. 1, 2019

(65) Prior Publication Data
US 2022/0191593 A1    Jun. 16, 2022

(30) Foreign Application Priority Data
Mar. 23, 2019  (CH) .................................. 00375/19

(51) Int. Cl.
*H04N 21/475* (2011.01)
*H04N 21/45* (2011.01)
(Continued)

(52) U.S. Cl.
CPC ..... *H04N 21/4755* (2013.01); *H04N 21/4532* (2013.01); *H04N 21/47202* (2013.01); *H04N 21/4886* (2013.01)

(58) Field of Classification Search
CPC ............. H04N 21/4622; H04N 21/478; H04N 21/4316; H04N 21/47; H04N 21/4722;
(Continued)

(56) References Cited

U.S. PATENT DOCUMENTS 6,314,426 B1 * 11/2001 Martin .................. G06F 3/0346
707/E17.093
2001/0013130 A1 * 8/2001 Shimizu ................. H04H 60/06
725/91
(Continued)

FOREIGN PATENT DOCUMENTS

WO          9939466 A1   8/1999
WO         12166925 A2  12/2012

OTHER PUBLICATIONS

International Search Report for PCT/IB2020/052593 prepared by the European Patent Office, dated May 7, 2020, 7 pages including the English Translation.

*Primary Examiner* — Jason Salce
(74) *Attorney, Agent, or Firm* — Brooks Kushman P. C.; John E. Nemazi

(57) ABSTRACT

A computer-implemented method for broadcasting multimedia information, the method comprising providing written, visual and/or audible information on an electronic device. The method including the steps of selecting, on the electronic device, a setup mode corresponding to a mode allowing a user to configure the program, displaying a request interface for selecting categories associated with one or more available multimedia content elements from a plurality of content sources, selecting at least a first category and sending the selection of categories, and optionally subcategories, to a multimedia information database. Subsequently, the method requires selecting an information broadcast mode, from several broadcast modes, before validating the end of the setup mode configuration and exiting the setup mode in order to broadcast the information according to the selected broadcast mode.

11 Claims, 7 Drawing Sheets

(51) Int. Cl.
*H04N 21/472* (2011.01)
*H04N 21/488* (2011.01)

(58) Field of Classification Search
CPC .............. H04N 21/8126; H04N 21/435; H04N 21/235; H04N 21/488
See application file for complete search history.

(56) References Cited

U.S. PATENT DOCUMENTS

| | | | |
|---|---|---|---|
| 2003/0009755 A1* | 1/2003 | Allibhoy | H04N 7/17318 348/E7.071 |
| 2003/0121054 A1* | 6/2003 | Lorenz | H04N 21/4532 725/112 |
| 2005/0177862 A1* | 8/2005 | Chen | H04N 21/4722 725/135 |
| 2005/0203970 A1* | 9/2005 | McKeown | G06Q 10/10 707/999.203 |
| 2005/0266793 A1* | 12/2005 | Grossman | H04M 1/72403 455/566 |
| 2006/0010476 A1* | 1/2006 | Kelly | H04N 7/17318 348/E7.071 |
| 2007/0061724 A1* | 3/2007 | Slothouber | H04N 21/4437 348/E5.006 |
| 2008/0201751 A1* | 8/2008 | Ahmed | H04N 21/43615 725/109 |
| 2010/0222102 A1* | 9/2010 | Rodriguez | H04N 21/6131 715/764 |
| 2011/0099263 A1 | 4/2011 | Patil et al. | |

\* cited by examiner

COMPUTER-IMPLEMENTED METHOD FOR PRESENTING MULTIMEDIA INFORMATION

CROSS-REFERENCE TO RELATED APPLICATION

This application is the U.S. national phase of PCT Application No. PCT/IB2020/052593 filed on Mar. 20, 2020, which claims priority to CH Patent Application No. 00375/19 filed on Mar. 23, 2019, the disclosures of which are incorporated in their entirety by reference herein.

The present invention relates to a computer-implemented method for delivering multimedia news content.

Currently, consumers have access to many means for receiving multimedia, in particular as regards the news.

For example, there are live news channels that broadcast news 24/7, often cyclically. One of the main drawbacks of these channels is that it is necessary to watch a complete news cycle to listen to the bit of news that is of interest. This mode of delivery is therefore time-consuming.

At present time, a plethora of dailies, magazines, sites and channels of every genre is present on mobile, in the form of dedicated applications or of mobile sites compatible with any telephone.

The practical side of these applications is the ability to remain connected all the time, to know what is going on in the world and even to be provided with news almost live via notifications.

Certain applications for mobile or tablet make provision for made-to-measure consumption of news. It is possible to attain a selection of essential and current news, and regular summaries of the news right through the day. It is thus possible to follow the news in real-time by subscribing to news alerts. It is also possible to personalize the application by selecting favorite themes (politics, economy, international news, business, etc.) and to access the news everywhere, all the time, even when not connected.

In order to prevent the latest news from being missed, certain applications make provision to deliver only the most important news as selected by the editorial staff of a journalistic site. There are for example sites that make provision for a "FLASH" mode of delivery, which consists in delivering any news live, minute-to-minute, via thematic flashes (news, economy, sport).

Certain applications are personalizable and make provision for a "FRONT PAGE" showing on a single screen the latest articles written on the favorite themes (politics, economy, sport, etc.) selected by the user himself.

Moreover, to learn more on subjects that are of interest, people have a tendency to watch news channels continuously without stop, to peruse the Internet and to compulsively open the alerts of news sites on their mobiles, this unfortunately having devastating effects. An article published by Forbes (15 Nov. 2015) warns against the consequences of this excess of anxiety-provoking news. The stress due to news of catastrophes may have a very substantial negative impact on mental and emotional health, and these negative effects last a long time. The consequences of such continuously repeated images on our health are symptoms such as trouble sleeping, anxiety, psychological distress or even depression.

To avoid excessive stress, it is advised to privilege the written press, whether in online or paper format, and the radio when keeping informed.

However, as described above, the news in mobile form is a source of stress.

By virtue of the method of the present invention, it is possible to take control of the news while limiting screen time and while guarding against stress but while nonetheless obtaining detailed news on subjects that are of interest and minimal news on subjects that are of limited interest.

According to the invention, a computer-implemented method for selectively delivering on demand multimedia news content consists in delivering written, visual and/or audible news, said news being gathered from and updated for example by journalists on the basis of various sources, to an electronic device, such as a smartphone, a tablet, a computer, a video streamer, or a smart TV. Each electronic device comprises at least one processor and one memory storing at least one program to be executed by the processor. The electronic device is configured to display images and/or to emit sounds. The method comprises the following steps:

selecting, on said electronic device, at least on the first use, a parameterization mode corresponding to a mode allowing a user to configure/personalize the program with a view to selective delivery of news;

displaying an interface for requesting selection of various categories of news that are associated with one or more multimedia content elements including written, visual and/or audio programs available to be viewed and/or listened to from a plurality of sources of content;

selecting at least one first category and optionally at least one subcategory of news comprised in a library of categories and of subcategories of news;

sending, to a database of multimedia news, the selection of categories and optionally of subcategories;

selecting a selective mode of delivery of news, for each category and/or subcategory of news selected, from a plurality of selective modes of delivery especially comprising:

a first selective mode of delivery that delivers only the headlines of the news in a selected category or subcategory, a second selective mode of delivery that delivers only a headline and brief summary of the news in a selected category or subcategory; and a third selective mode of delivery that delivers only a detailed version of the news contained in a selected category or subcategory;

validating the end of the configuration of the parameterization mode and exiting the parameterization mode;

selectively delivering, for each selected category and subcategory of news, the news in the mode of delivery selected for this category or subcategory, allowing each user to view and/or listen to, on an electronic device, the news content in the selected mode of delivery.

In one embodiment, the content of the database of multimedia news is of the type that is regularly updated and the up-to-date content and optionally archived content is delivered.

In one embodiment, the database of multimedia news comprises a plurality of sources of content each source being updated at an interval that may be different from one source of content to another.

In one embodiment, the selection of the parameterization mode comprises selecting a source of content and the frequency of access to the database for the delivery of news.

Preferably, during the delivery of each selected category and subcategory, the option is made available to exchange the selected mode of delivery, making it possible to view and/or listen to, instead of the content of the mode of delivery of the selected category or subcategory, another mode of delivery of the content of this category or subcategory.

In one embodiment, the method further comprises determining sources of content that are accessible to the electronic device, by determining permission data for the sources of content accessible to the electronic device.

Preferably, the news relative to the content of the sources of content are presented on a display associated with the electronic device.

In one embodiment, the first mode of delivery/viewing comprises fewer than 200 characters or lasts less than 20 seconds, the second mode of delivery/viewing comprises fewer than 1500 characters or lasts less than 1 minute and 30 seconds, and the third mode of delivery/viewing comprises more than 1500 characters or lasts more than 1 minute and 30 seconds.

In one embodiment, the database of multimedia news is a local multimedia database chosen from the group consisting of a hard disk, a digital video recorder, a media server, a desktop computer and a laptop computer.

In another embodiment, the database of multimedia news is an external database.

Preferably, the interface for requesting selection of categories comprises one or more content filters, and the multimedia news content received satisfies the one or more content filters. The one or more content filters are chosen from the group consisting of genre, duration, level of video and/or audio quality, text, type of content, and source of content.

The sources of content are chosen from the group consisting of a digital recorder, a satellite radio channel, a live radio channel, a live television channel, a satellite television channel, an Internet-protocol television channel and a continuous media server, websites, and press agencies, each source of content being associated with one respective application on the electronic device for reading its associated multimedia content elements.

The invention also relates to a non-transitory computer-readable storage medium storing at least one program configured to be executed by at least one processor of a computational system, the at least one program comprising instructions to perform the method according to the present invention.

The features of the invention will become more dearly apparent on reading the description of a plurality of embodiment that are given merely by way of completely nonlimiting example, with reference to the schematic figures, in which:

FIG. 7 shows a schematic of the first time an application is turned on.

Figure 7:
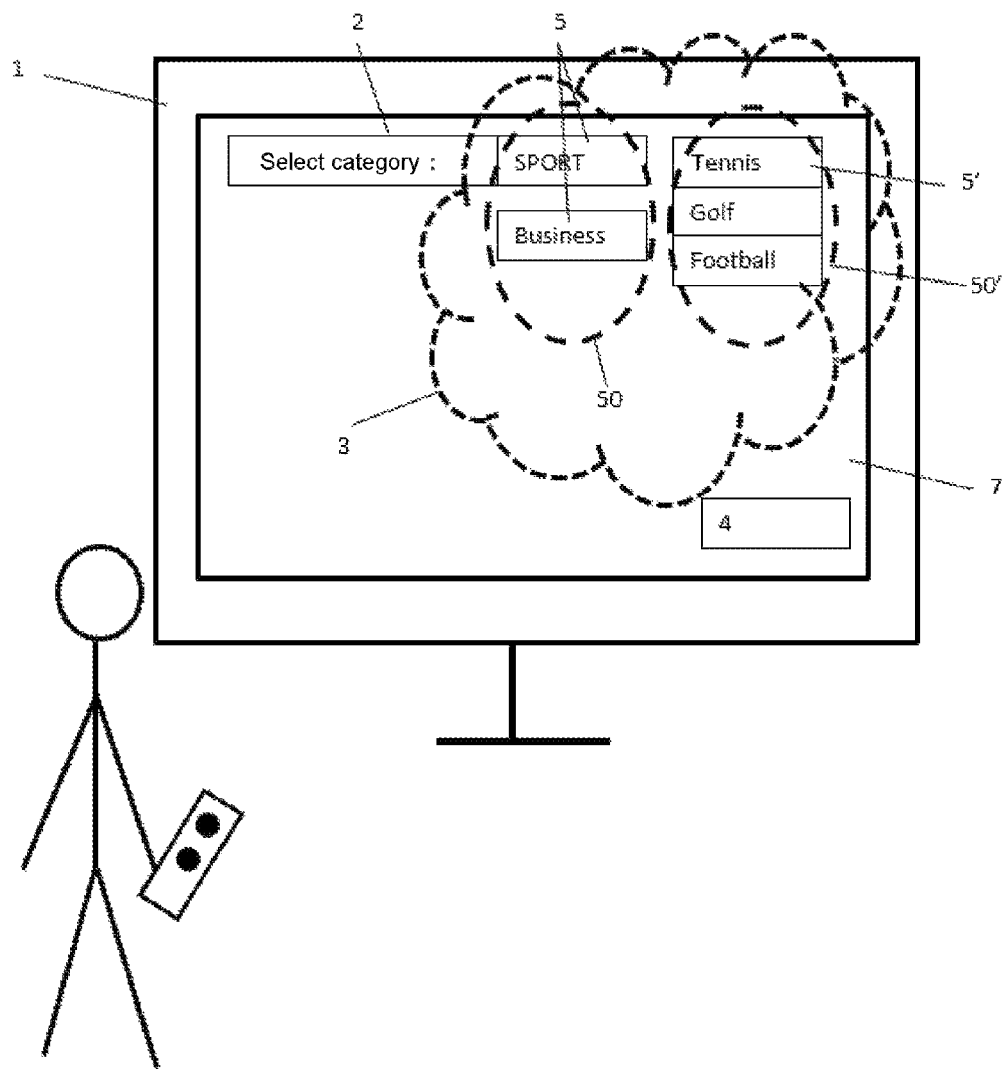

As illustrated in FIG. 7, on the first time the application installed on a Smart TV 1 is turned on, the user selects a parameterization mode corresponding to a mode allowing the program to be configured/personalized.

In this example, the first step consists in displaying an interface 2 for requesting selection of categories associated with a plurality of multimedia content elements 3 including written, visual and audio programs available to be viewed and listened to from a plurality of sources 4 of content. The user selects a first category 5 Sport and a subcategory 5', Tennis, Golf or Football, comprised in a library of categories 50 and of subcategories 50'.

The program sends to a database 6 of multimedia news the selection of categories 5 and of subcategories 5'.

The user selects one mode of viewing M1, M2, M3 news for each category 5 and subcategory 5' selected.

The user validates the end of the configuration of the parameterization mode and exits the parameterization mode.

The user then starts the program and views, on the Smart TV 1, for each category 5 and subcategory 5' selected, news in the mode of delivery/viewing M1, M2 or M3 selected for this category 5 and subcategory 5'.

Figure 1:
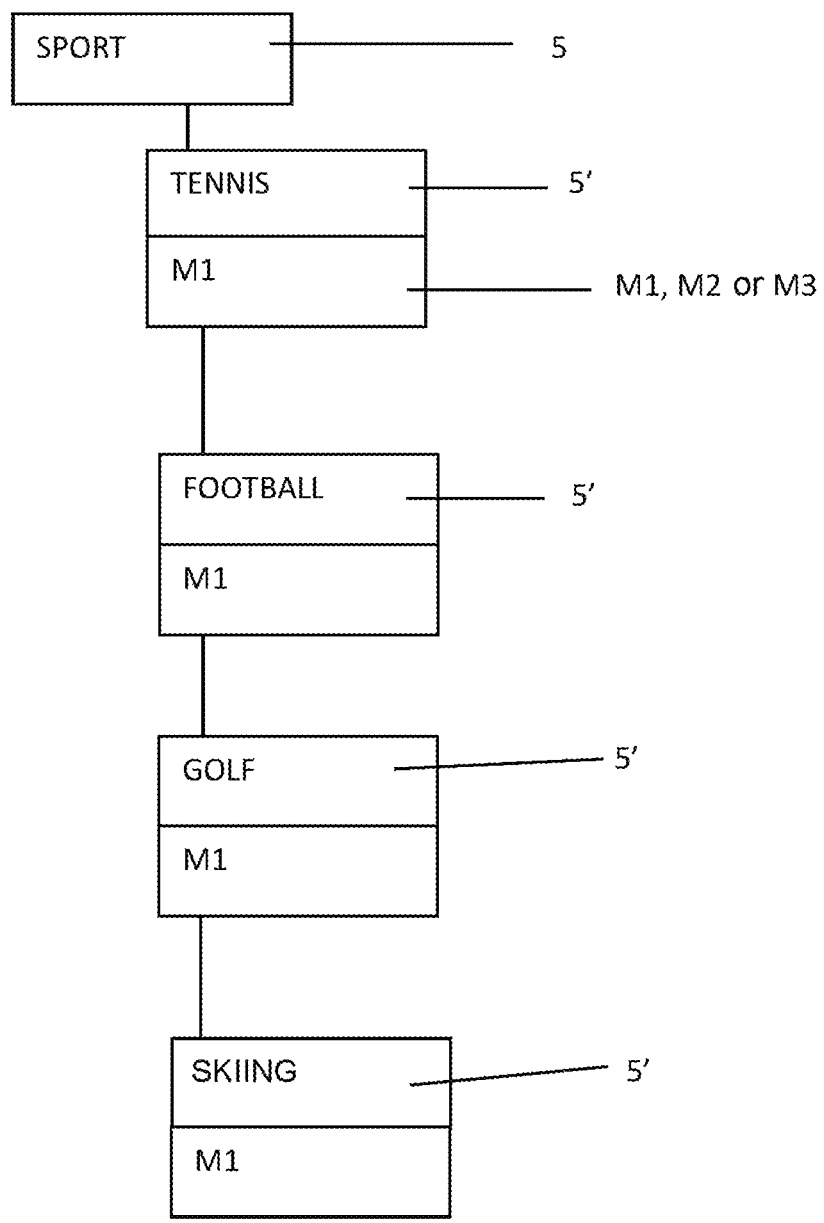
FIG. 1 shows one embodiment of a first category comprising four subcategories selected for a first mode of delivery.

As illustrated in FIG. 1, the user has selected the desired first category 5, namely Sport, then has selected the subcategories 5' Tennis, Football, Golf and Skiing. The user has chosen the desired mode of delivery/viewing, namely a first mode of delivery/viewing M1 that lasts less than 20 seconds.

In this configuration, when the user starts the delivery of his "Sports News", he will view news related to the subcategories 5' Tennis, Football, Golf and Skiing in the mode of viewing M1, in which mode each news item related to a subcategory 5' will last no longer than 20 seconds.

Figure 2:
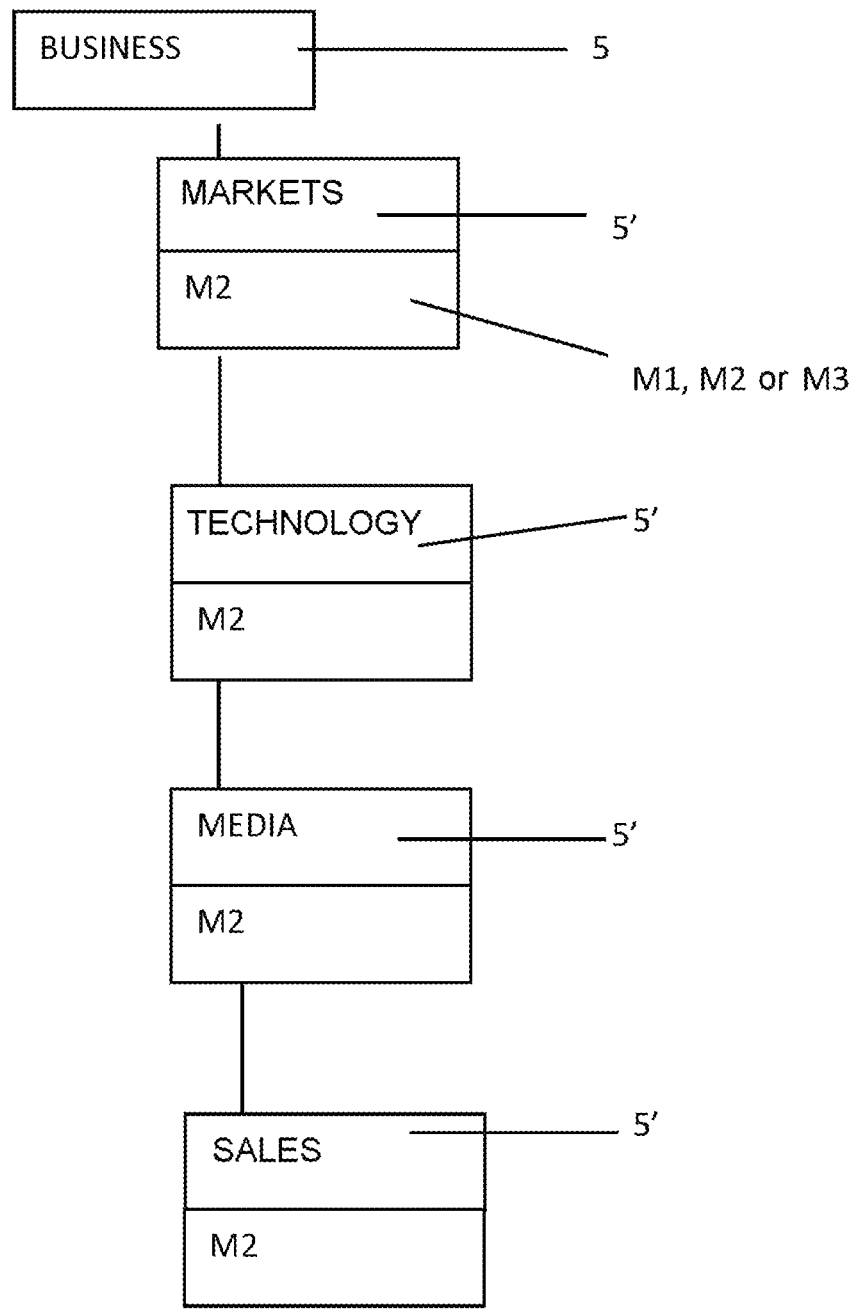
FIG. 2 shows one embodiment of a second category comprising four subcategories selected for a second mode of delivery.

As illustrated in FIG. 2, the user has selected the desired first category 5, namely Business then has selected the subcategories 5' Markets, Technology, Media, and Sales. The user has chosen the desired mode of delivery/viewing namely a second mode of delivery/viewing M2, which lasts less than 1 minute and 30 seconds.

In this configuration, when the user starts delivery of his "Business News", he will view news related to the subcategories 5' Markets, Technology, Media, and Sales in the mode of viewing M2, in which mode each news item related to a subcategory 5' will last no longer than 1 minute and 30 seconds.

Figure 3:
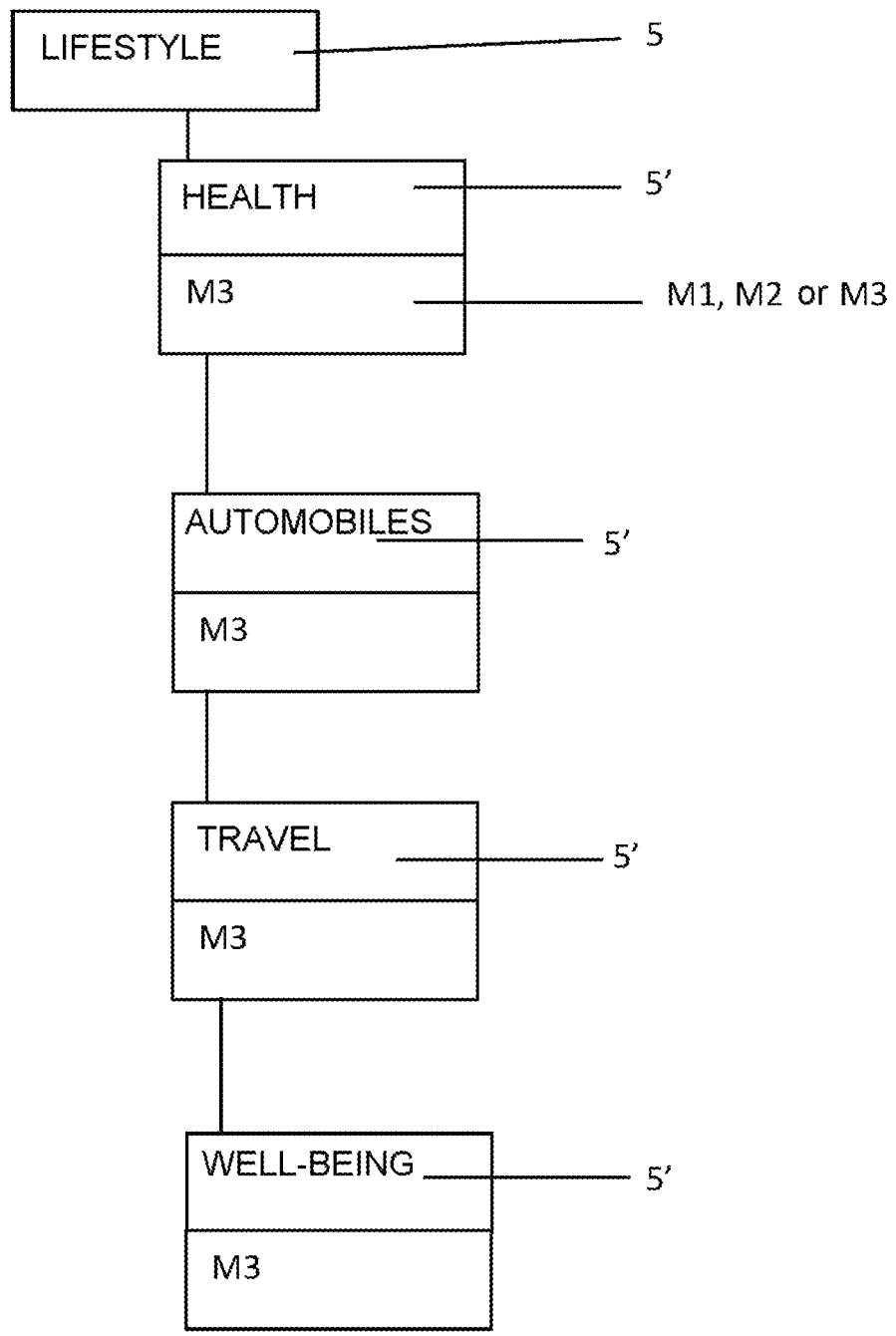
FIG. 3 shows one embodiment of a third category comprising four subcategories selected for a third mode of delivery.

As illustrated in FIG. 3, the user has selected the desired first category 5, namely Lifestyle then he has selected the subcategories 5' Health, Automobiles, Travel, and Well-being. The user has chosen the desired mode of delivery/viewing namely a third mode of delivery/viewing M3 that lasts at least 1 minute and 30 seconds.

In this configuration, when the user starts the delivery of his "Lifestyle News", he will view news related to the subcategories 5' Health, Automobiles, Travel, and Well-being in the mode of viewing M3, in which mode each news item related to a subcategory 5' will last at least 1 minute and 30 seconds.

Figure 4:
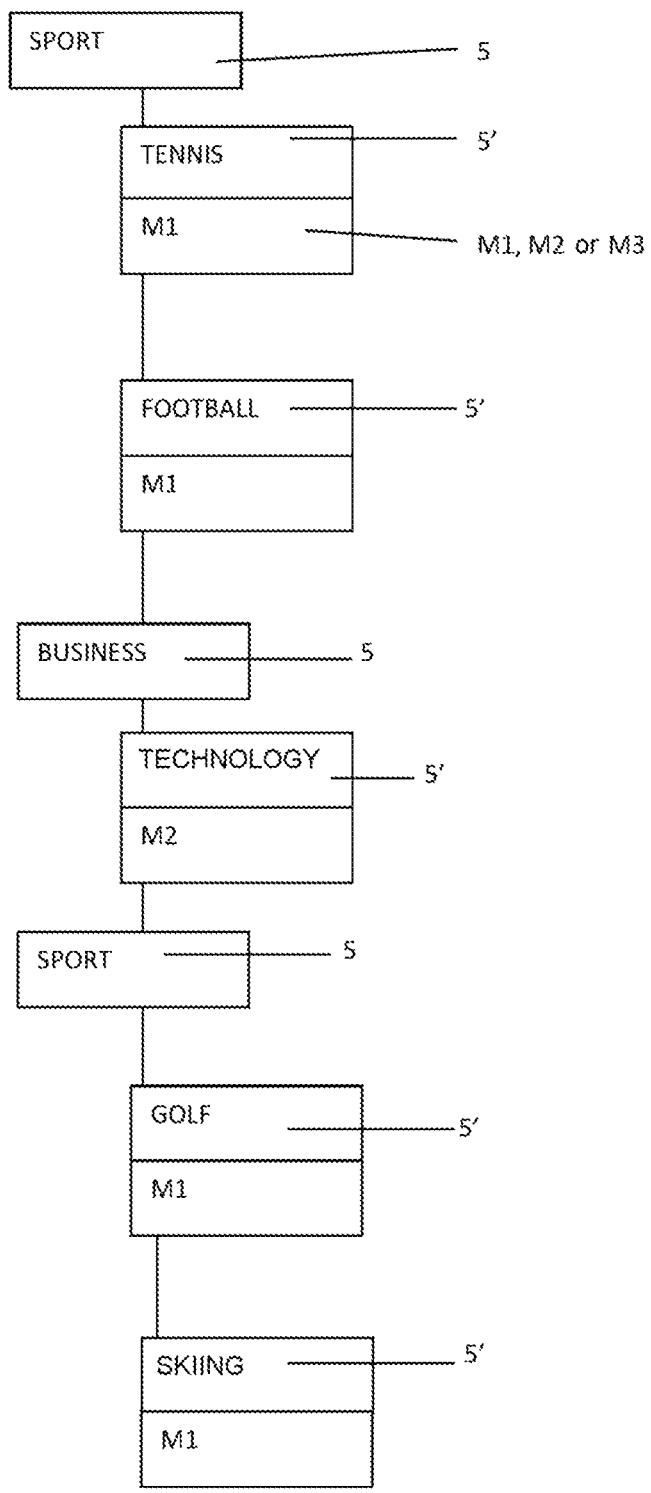
FIG. 4 shows one embodiment of two categories comprising four subcategories and one subcategory, respectively, each of the categories being delivered in a different mode.

As illustrated in FIG. 4, the user has selected the desired first category 5, namely Sport then he has selected the subcategories 5' Tennis and Football, then he has switched to the category 5 Business and has selected the subcategory 5' Technology before returning to the category 5 Sport and selecting the subcategories 5' Golf and Skiing. The user has chosen the mode of delivery/viewing desired for each subcategory namely a first mode of delivery/viewing M1 that will last less than 20 seconds for all the Sport subcategories 5' and a second mode of delivery/viewing M2 that will last less than 1 minute and 30 seconds for the subcategory 5' Technology.

In this configuration, when the user starts the delivery of his "News", he will view news related to the subcategories 5' Tennis and Football, in the mode of viewing M1 then the subcategory 5' Technology in the second mode of viewing M2 and the subcategories 5' Golf and Skiing in the first mode of viewing M1.

Figure 5:
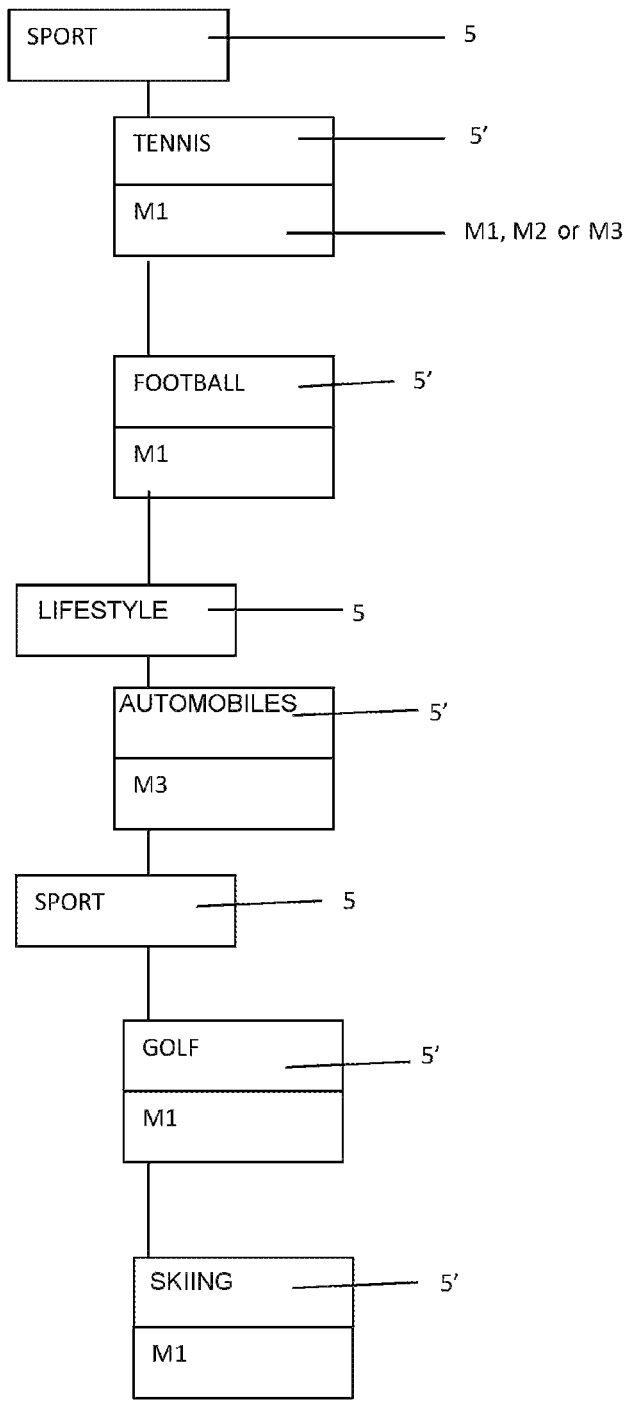
FIG. 5 shows one embodiment of two categories comprising four subcategories and one subcategory, respectively, each of the categories being delivered in a different mode.

As illustrated in FIG. 5, the user has selected the desired first category 5, namely Sport then has selected the subcategories 5' Tennis and Football, then has switched to the category 5 Lifestyle and has selected the subcategory 5' Automobiles before returning to the category 5 Sport and selecting the subcategories 5' Golf and Skiing. The user has chosen the mode of delivery/viewing desired for each subcategory namely a first mode of delivery/viewing M1 that lasts less than 20 seconds for all the Sport subcategories 5' and a third mode of delivery/viewing M3 that lasts more than 1 minute and 30 seconds for the subcategory 5' Automobile.

In this configuration, when the user starts the delivery of his "News", he will view news related to the subcategories 5' Tennis and Football, in the first mode of viewing M1 then the subcategory 5' Automobile in the third mode of viewing M3 and the subcategories 5' Golf and Skiing in the first mode of viewing M1.

Figure 6:
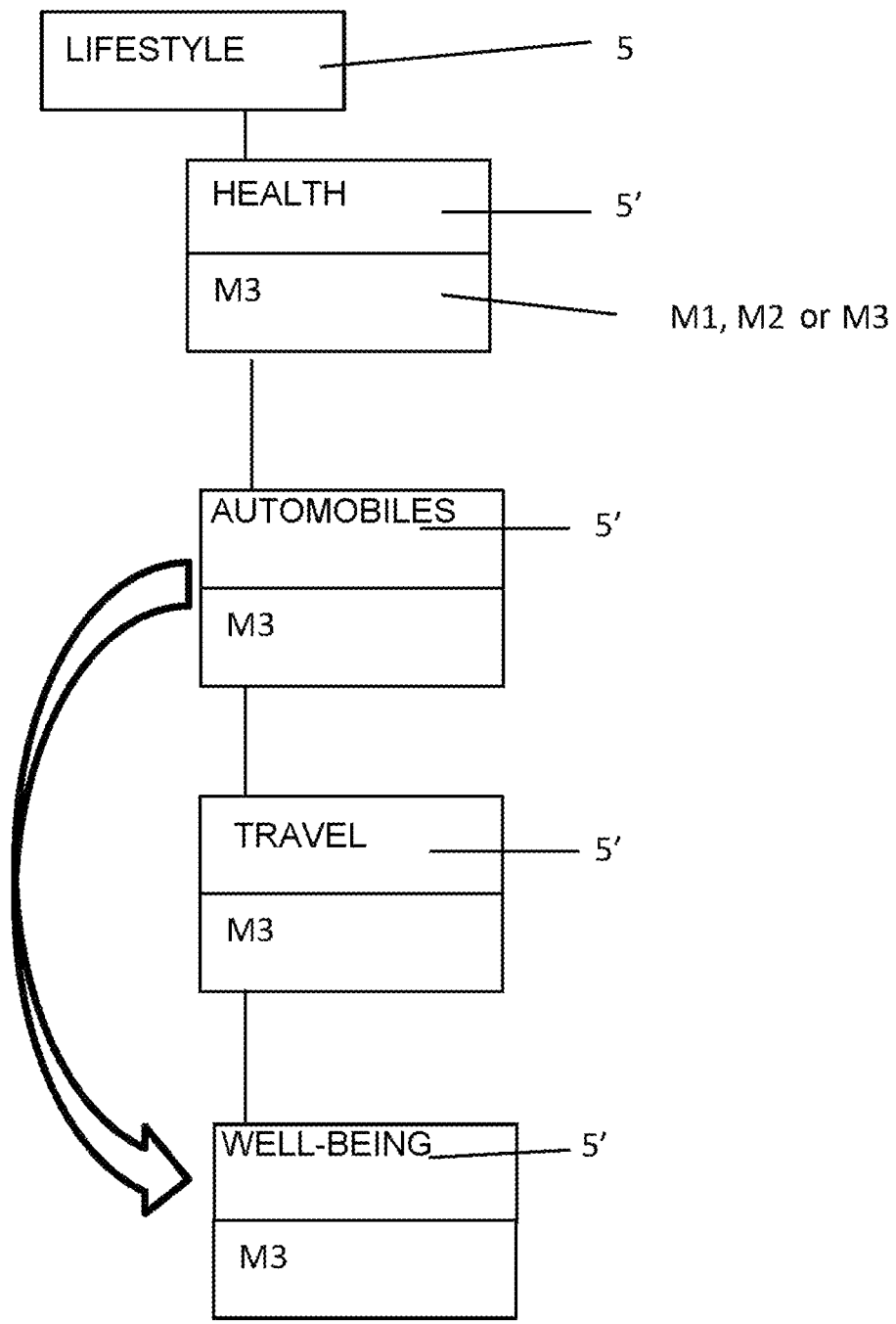
FIG. 6 shows one embodiment of a third category comprising four subcategories delivered in a third mode of delivery and in which embodiment a user decides to accelerate consumption by passing from viewing the second subcategory to the fourth subcategory.

As illustrated in FIG. 6, the user has selected the desired first category 5, namely Lifestyle then he has selected the subcategories 5' Health, Automobiles, Travel, and Well-being. The user has chosen the desired mode of delivery/viewing namely a second mode of delivery/viewing M3 that lasts at least 1 minute and 30 seconds.

In this configuration, when the user starts the delivery of his "Lifestyle News", he will view news related to the subcategories 5' Health, Automobiles, Travel, and Well-being in the mode of viewing M3, in which mode each news item related to a subcategory 5' will last at least 1 minute and 30 seconds. This being so, in the illustrated example, the user decides to accelerate viewing of his "News" by passing directly from viewing the subcategory 5' Automobile to the subcategory 5' Well-being without viewing the subcategory 5' Travel.

In each of the examples mentioned, it is possible to parameterize the desired mode of delivery/viewing, namely, only videos (possible option of subtitles), only texts (possible option of audio text) or a mixture of the two.

To increase the comfort of use, the mode of delivery/viewing may also be parameterized depending on the type of device used. For example, on a smartphone the application may be parameterized in order to read only text, and its TV may be parameterized in order to view only videos.

To simplify use, a general configuration of the application also allows the delivery of the news to be tailored to the electronic device. Thus, it is no longer the user that parameterizes the application depending on the electronic device but the application that tailors itself to the electronic device.

Depending on the needs and wants of the user, the parameterization mode allowing the "News" to be configured may be modified on demand.

For additional comfort, it is possible to configure and register a plurality of users so that each user views a personalized program. For example, when a plurality of users are registered, on start-up of the program, it is possible to select the desired user by clicking on an icon related to the user, this having the effect of starting the "News" associated with the user.

This application functions on any electronic medium, Smart TV, tablet, smartphone, PC, etc.

For the sake of confidentiality, each news program may be started after a secure access has been unlocked, an example of such a secure access being an automatic recognition system that starts the application for the correct user, such a system for example being a video sensor, and audio sensor, a fingerprint sensor, etc.

To save time, a synchronizing system is provided to allow for an interruption of a program. Specifically, if a program is interrupted on one electronic device, the program continues from the point that it was interrupted, as soon as the user connects on the same device or even on another device with his user profile.

The method provides a new mode of news delivery/viewing in a plurality of modes of delivery/viewing. It is the first news application that presents the news in various modes of delivery/viewing or display options. In the illustrative examples, the mode M1 takes the form of long headlines that spell out the latest news and include the most important details, the mode M2 delivers brief articles and/or short videos that capture the most important aspects of the news, and associated details and the mode M3 delivers long articles and/or detailed videos. Each long video contains many scenes that could have been deleted in the editing process. It allows the user to acquire as much news as possible on an event or a situation. Users will be encouraged to share the entirety of unedited versions of the report, because the latter will be available nowhere else.

By virtue of the present invention, the user gains a new way of watching daily news. After having filtered the preferences of the user, the news bulletin may be viewed in three ways:

Mode 1: identical to level 1 in the news section.

Mode 2: short consecutive videos of the complete bulletin.

Mode 3: long consecutive videos of the complete bulletin.

While viewing the videos of the news bulletin in the abridged version, the user may click on the segment that he is watching in order to display the complete video. Afterwards, the shortest version of the following video will be played. Conversely, if the user decides to watch the long version of the news bulletin and loses interest in certain of the reports, these reports may be ignored on a click of a button and the rest will follow.

In one unillustrated example, the user may select the mode of delivery then select categories and subcategories for each of these modes of delivery. For example, the user selects the first mode of delivery M1 then selects all the categories and subcategories that are of interest, then he selects the second mode of delivery M2 then selects all the categories and subcategories that are of interest and lastly the third mode of delivery M3 then selects all the categories and subcategories that are of interest.

The invention claimed is:

1. A computer-implemented method for selectively delivering, to a user, on demand multimedia news content, namely written content, visual content, audible content or visual and audible content, said content being gathered from and updated from various sources, to an electronic device of the user, said electronic device having at least one processor and one memory storing at least one program to be executed by the at least one processor, the electronic device being configured to display images or to emit sounds or to display images and emit sounds, said content being presentable on a display of the electronic device, the method comprising the following steps:
- selecting, by the user, on said electronic device, at least on the first use, a parameterization mode corresponding to a mode allowing the user to configure or otherwise personalize the program for said selective delivery of the content;
- displaying, by the processor, on the display of the electronic device, an interface for requesting selection, by the user, of various categories of content that are associated with one or more multimedia content elements including written, visual programs or audio programs or visual and audio programs available to be viewed or listened to or viewed and listened to from a plurality of sources of content;
- selecting, by the user via the interface, at least one first category and optionally at least one subcategory of content comprised in a library of categories and of subcategories of content;
- sending, from the electronic device to a database of multimedia content, the selection of categories and optionally of subcategories, and selecting one selective mode of delivery of the content, for each category and/or subcategory of content selected from a plurality of selective modes of delivery comprising in particular:
- a first selective mode of delivery in which only the headlines of the content in a selected category or subcategory are delivered, the first selective mode of delivery allowing for the user to view said delivered content in less than 20 seconds;
- a second selective mode of delivery in which only a headline and a brief summary of the content in a selected category or subcategory; the second selective mode of delivery allowing for the user to view said delivered content in of less than 1 minute and 30 seconds; and
- a third selective mode of delivery in which only a detailed version of the content contained in a selected category or subcategory is delivered the third selective mode of delivery allowing for the user to view said delivery of content in at least 1 minute and 30 seconds;
- validating, by the user, on the electronic device, the end of the configuration of the parameterization mode and exiting the parameterization mode; and
- selectively delivering, from the database of multimedia content to the electronic device, for each selected category and subcategory of content, the content in the mode of delivery selected for this category or subcategory, so that when there is a plurality of categories or subcategories or categories and subcategories, delivery according to the mode of delivery selected for the respective category or subcategory is performed, thus allowing the user to view or listen to or to view and listen to the delivered content within one from three selectable time ranges, on the electronic device;
- wherein during the delivery of each selected category and subcategory, the option is made available to the user to exchange the selected mode of delivery making it possible to view or listen to or to view and listen to, said delivered content within a different time range than the mode of delivery initially selected for said category or subcategory would have allowed.

2. The method as claimed in claim 1, wherein the content of the database of multimedia content is of the type that is regularly updated and the up-to-date content and optionally archived content is delivered.

3. The method as claimed in claim 1, wherein the database of multimedia content comprises a plurality of sources of content each source being updated at an interval that may be different from one source of content to another.

4. The method as claimed in claim 1, wherein the selection of the parameterization mode comprises selecting a source of content and the frequency of access to the database for the delivery of content.

5. The method as claimed in claim 1, further comprising determining sources of content that are accessible to the electronic device, by determining permission data for the sources of content accessible to the electronic device.

6. The method as claimed in claim 1, wherein the content relative to the content of the sources of content are presented on a display associated with the electronic device.

7. The method as claimed in claim 1, wherein the database of multimedia content is a local multimedia database chosen from the group consisting of a hard disk, a digital video recorder, a media server, a desktop computer and a laptop computer.

8. The method as claimed in claim 1, wherein the interface for requesting selection of categories comprises one or more content filters, and the multimedia news content received satisfies the one or more content filters.

9. The method as claimed in claim 1, wherein the one or more content filters are chosen from the group consisting of genre, duration, level of video and/or audio quality, type of content, and source of content.

10. The method as claimed in claim 1, wherein the sources of content are chosen from the group consisting of a digital recorder, a satellite radio channel, a live radio channel, a live television channel, a satellite television channel, an Internet-protocol television channel and a continuous media server, a website, and a press agency, each source of content being associated with one respective application on the electronic device for reading its associated multimedia content elements.

11. A non-transitory computer-readable storage medium storing at least one program configured to be executed by at least one processor of a computational system, and at least one program comprising instructions to perform the method as claimed in claim 1.

* * * * *